(12) United States Patent
Simpkins

(10) Patent No.: US 7,684,611 B2
(45) Date of Patent: Mar. 23, 2010

(54) PHOTORESIST EDGE BEAD REMOVAL MEASUREMENT

(75) Inventor: Patrick Simpkins, Edina, MN (US)

(73) Assignee: Rudolph Technologies, Inc., Flanders, NJ (US)

( * ) Notice: Subject to any disclaimer, the term of this patent is extended or adjusted under 35 U.S.C. 154(b) by 182 days.

(21) Appl. No.: 11/676,140

(22) Filed: Feb. 16, 2007

(65) Prior Publication Data

US 2008/0002877 A1  Jan. 3, 2008

Related U.S. Application Data

(63) Continuation of application No. 10/890,933, filed on Jul. 14, 2004, now Pat. No. 7,197,178.

(60) Provisional application No. 60/486,950, filed on Jul. 14, 2003.

(51) Int. Cl.
*G06K 9/00* (2006.01)
*G01R 31/26* (2006.01)
*A61N 5/00* (2006.01)
*G01B 7/00* (2006.01)

(52) U.S. Cl. .................. 382/145; 438/16; 250/492.2; 702/155

(58) Field of Classification Search .............. None
See application file for complete search history.

(56) References Cited

U.S. PATENT DOCUMENTS

| 6,559,457 B1 * | 5/2003 | Phan et al. ............ 250/491.1 |
| 6,996,265 B1 * | 2/2006 | Patnaik .................. 382/149 |
| 2003/0030050 A1 * | 2/2003 | Choi ........................ 257/4 |

* cited by examiner

*Primary Examiner*—Charles Kim
(74) *Attorney, Agent, or Firm*—Dicke, Billig & Czaja, PLLC

(57) ABSTRACT

An edge bead removal measurement method includes determining an edge of a wafer about a circumference of the wafer. A location of a wafer notch on the edge of the wafer is determined. A location of a center of the wafer is determined. A distance from the edge of the wafer to an edge bead removal line about the circumference of the wafer is determined.

22 Claims, 10 Drawing Sheets

PHOTORESIST EDGE BEAD REMOVAL MEASUREMENT

CROSS-REFERENCE TO RELATED APPLICATIONS

This application is a continuation of U.S. application Ser. No. 10/890,933, filed Jul. 14, 2004 now U.S. Pat. No. 7,197,178 and entitled "Photoresist Edge Bead Removal Measurement." which claims the benefit of U.S. Provisional Application Ser. No. 60/486,950, filed Jul. 14, 2003 and entitled "Photo Resist Edge Bead Removal Measurement".

BACKGROUND

1. Technical Field

The present invention relates to a method for finding the distance from the edge of a wafer to the location where photoresist was removed around the circumference of the wafer via an edge bead removal process.

2. Background Information

Over the past several decades, the semiconductor has exponentially grown in use and popularity. The semiconductor has in effect revolutionized society by introducing computers, electronic advances, and generally revolutionizing many previously difficult, expensive and/or time consuming mechanical processes into simplistic and quick electronic processes. This boom in semiconductors has been fueled by an insatiable desire by business and individuals for computers and electronics. Therefore, there is a need for faster, more advanced computers and electronics. To satisfy this need, quality and efficiency is required, whether it be on an assembly line, on test equipment in a lab, on the personal computer at one's desk, or in home electronics and toys.

Manufacturers of semiconductors have made vast improvements in end product quality, speed and performance as well as in manufacturing process quality, speed and performance. However, there continues to be demand for faster, more reliable and higher performing semiconductors. To assist these demands, better inspection is necessary to increase yields. One area that has been generally ignored is the edge of the semiconductor wafer. It is believed that inspection of such edge area will lead to better information on defects, thereby enabling improved process control and improved wafer yields.

Typically, during conventional applications of masking layers or photoresist layers onto a semiconductor wafer, a desired amount of liquid photoresist is applied to the top surface of the semiconductor wafer while the wafer is being rotated. Thus, as a semiconductor is rotated, the photoresist materially spreads radially outward from the center of the semiconductor wafer and toward the edge of the semiconductor wafer such that the entire top of the wafer is coated with a layer of photoresist. Excess amounts of photoresist can accumulate and form a mound or bead of photoresist on the outer edge of the semiconductor wafer. In order to illuminate the "edge bead" of photoresist, a coating system known as an edge bead removal (EBR) unit can be employed.

Two types of EBR units are well known in the art, chemical and optical. Chemical EBR units include a nozzle, which dispenses a solvent referred to as EBR fluid, onto the photoresist of the semiconductor wafer. The solvent dissolves or develops away the photoresist and allows for easy removal of the photoresist from the edge of the semiconductor wafer. In an optical EBR unit, the photoresist at or near the edge of the semiconductor wafer is exposed to light. During subsequent development processes, the exposed photoresist is removed. Photoresist, which remains on the semiconductor wafer, forms a mask for subsequent processing operation.

Typically, several different EBR units are utilized during fabrication of integrated circuit devices on semiconductor wafers. The use of different EBR units commonly results in a random or non-uniform stacking of substrate layers at or near the edge of semiconductor wafer. The random or uneven stacked substrate layers can lift and detrimentally re-deposit onto the semiconductor wafer. The redeposited substrate material can contaminate the semiconductor wafer and cause defects in the integrated circuit devices formed on the wafer.

In many applications, inspection of the edge area of a semiconductor wafer corresponds directly to obtaining information on defects within the semiconductor wafer including delamination of thin films, chipping and cracking of the wafer, resist removal metrology, and particle detection. Therefore, it is desirous to find the distance from the edge of the wafer to the location where the photoresist was removed as a tool in the semiconductor wafer inspection process.

SUMMARY

An edge bead removal measurement method includes determining an edge of a wafer about a circumference of the wafer. A location of a wafer notch on the edge of the wafer is determined. A location of a center of the wafer is determined. A distance from the edge of the wafer to an edge bead removal line about the circumference of the wafer is determined.

DETAILED DESCRIPTION

The edge bead removal (EBR) measurement method of the present invention is a method for finding the distance from the edge of a semiconductor wafer to a location where photoresist was removed about the circumference of the wafer. This location is also known as an EBR line. Generally, there are four (4) parts of the EBR measurement method or algorithm: finding the wafer edge, finding the wafer notch or flat, finding the wafer center, and finding the location of the outer edge of the photoresist (EBR line). The result of the method is that the position of the outer edge of the photoresist is identified with respect to the wafer edge at all locations about the circumference of the wafer.

More specifically, the EBR measurement method includes a series of digital images collected by a camera, such as a digital inspection camera. The entire circumference of the outer edge of the semiconductor wafer is acquired. The wafer notch location geometry on the wafer edge is extracted. Every wafer includes a notch manufactured on the wafer edge for wafer alignment purposes. The wafer center location is determined in relationship to the inspection camera coordinate system and in relationship to the wafer notch. The distance from the edge of the wafer to the location where the photoresist was removed is determined about the entire circumference of the wafer. The wafer center computed location can also be used for various later steps, such as reporting defects found on the semiconductor wafer or for allowing a normal inspection camera positioned normal to the wafer edge to track the normal edge and permit the normal camera to maintain proper focal distance from the normal edge of the wafer. A number of resist layers may be present on the wafer that have had an edge bead removed. Thus, each EBR line of interest must be identified or tracked.

Figure 1:
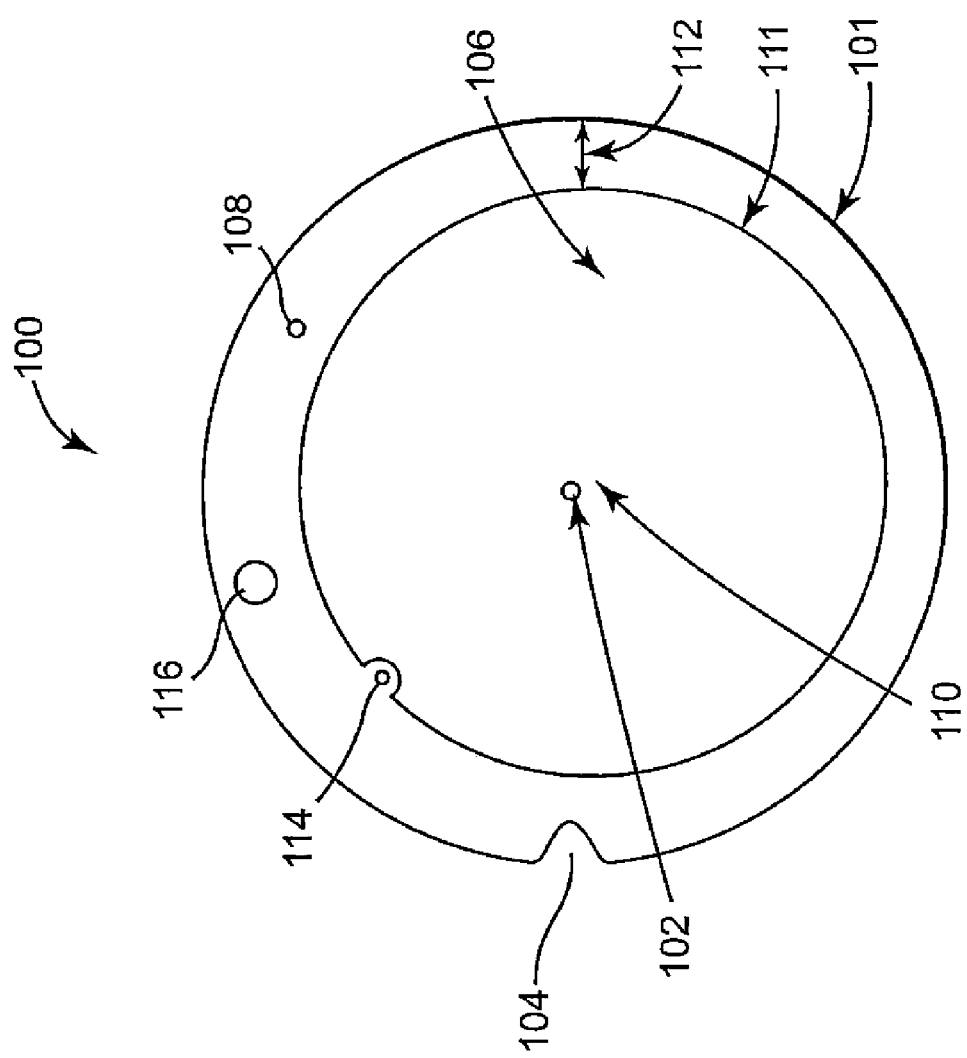
FIG. 1 is a top view illustrating a semiconductor wafer having an edge bead removed.

FIG. 1 is a top view of semiconductor wafer 100. Wafer 100 includes wafer edge 101, wafer center 102, wafer notch 104, photoresist 106, wafer area 108 having the photoresist removed, photoresist center 110, photoresist edge 111, edge bead removal distance 112, wafer area 114 where photoresist should be present, but has been removed, and wafer area 116 with photoresist present which should have been removed. As shown in FIG. 1, photoresist center 110 is not identical to wafer center 102. As is often the case, when a photoresist layer, such as photoresist 106, is fabricated upon a wafer, such as wafer 100, the center of the photoresist is not always equal to a center of the wafer. This inconsistency is often due to operator or mechanical error.

As shown in FIG. 1, photoresist center 110 is drastically different from wafer center 102, such that the ill-fitted alignment can be seen by the human eye. However, in many circumstances, photoresist 106 is fabricated on the wafer 100 such that it appears to the human eye to be aligned with wafer 100. However, upon closer inspection, ideal alignment is not achieved.

As shown in FIG. 1, EBR line 112 is the distance between wafer edge 101 and photoresist edge 111. It is important to determine edge bead removal distance 112 about the entire circumference of wafer 100, as the distance is not consistent about the circumference of the wafer. Furthermore, wafer areas such as wafer area 114 should include photoresist; however, the photoresist has been removed from wafer area 114 due to one of a variety of circumstances, such as fabrication or processing inconsistencies or defects known in the art. Wafer area 114 must be identified during the edge inspection process. Likewise, wafer areas such as wafer area 116 include photoresist; however, the photoresist should not be located in this area. Wafer area 116 may be a product of fabrication error or processing inconsistencies or defects. Once again, wafer area 116 must be identified during the edge inspection process.

Figure 2:
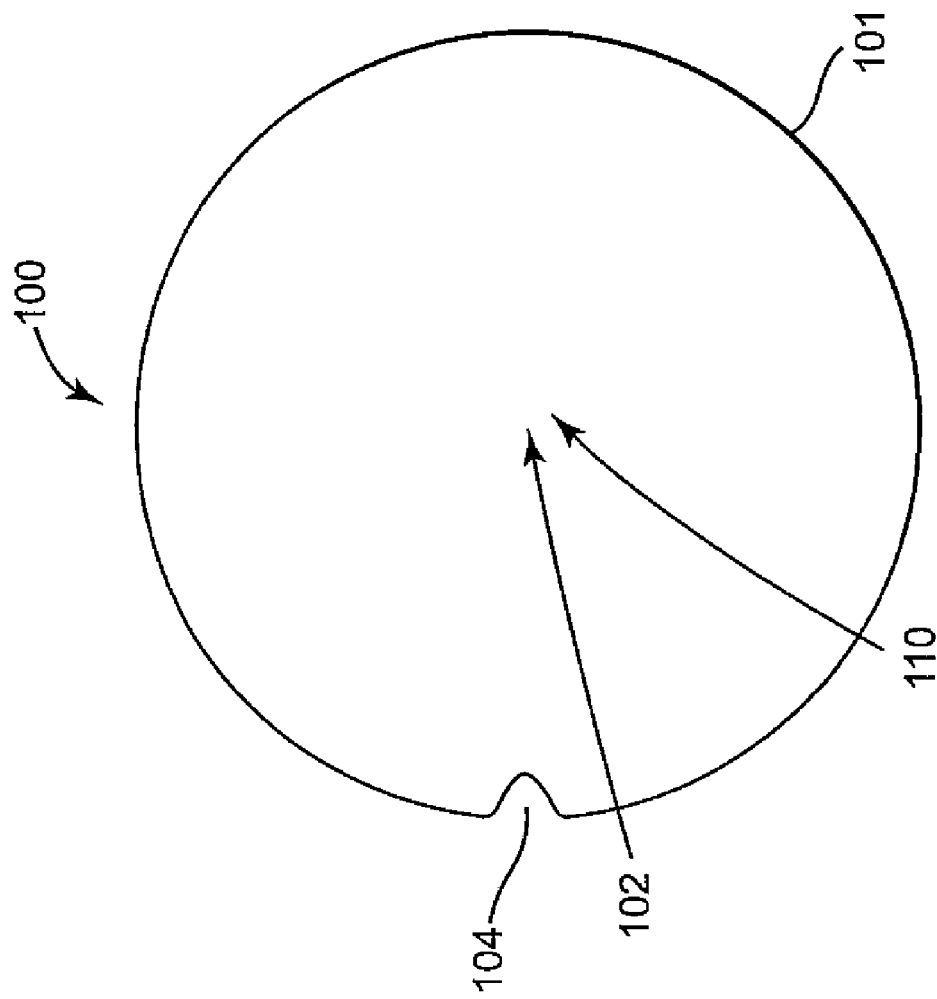
FIG. 2 is a top view illustrating a wafer.

FIG. 2 is a top view illustrating wafer 100. As previously discussed, wafer 100 includes wafer edge 101, wafer center 102, and wafer notch 104. Rotation center 120 represents the center of rotation of wafer 100 during fabrication. The fabrication of a wafer, such as wafer 100, includes various automated steps. Several of the automated steps includes wafer 100 being secured on a vacuum chuck of an automated machine for rotation for transport purposes. However, due to automation errors, rotation center 120 does not always align with wafer center 102. Therefore, when rotation center 120 is not aligned with wafer center 102, as shown in FIG. 2, the result can be a photoresist layer, such as photoresist layer 106, eccentrically positioned on wafer 100.

Figure 3:
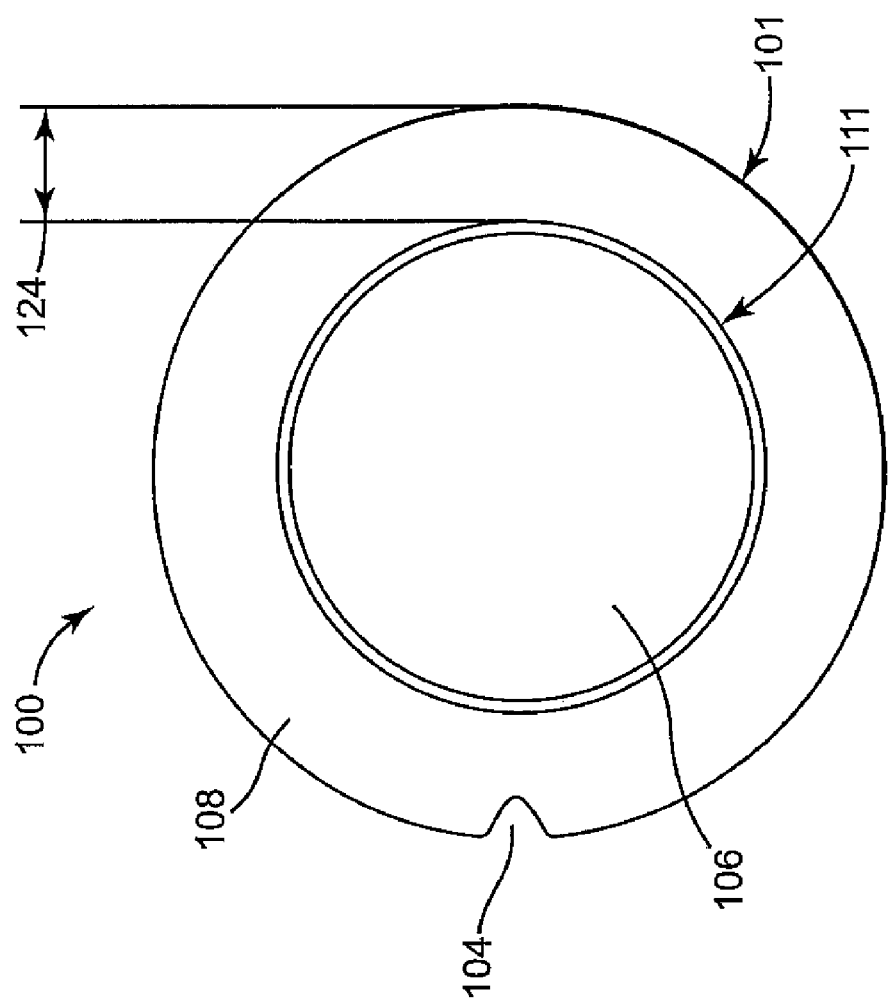
FIG. 3 is a top view illustrating a wafer in a darkfield environment.

FIG. 3 is a top view illustrating wafer 100 in a darkfield environment. During various fabrication and inspection steps, darkfield and/or brightfield illumination technology can be utilized in order to determine the EBR line about the circumference of wafer 100. Darkfield illumination is a process where light is concentrated towards an EBR edge at a relatively shallow angle, and the light is projected off the EBR edge upwards towards a top surface camera. Brightfield illumination is a process where light travels through a beamsplitter and virtually straight down to the top surface of a wafer and is projected back up towards the top surface camera.

In one embodiment, two passes of data around the circumference of wafer 100 is completed. The first pass is brightfield data, while the second pass is darkfield data. This enables more reliable detection of the EBR line for resist removal metrology and the ability to better detect and classify particles and other contaminants as either surface particles or embedded particles. In one embodiment, all of the data from a single wafer is collected in less than approximately 10 seconds and processed in less than approximately 30 seconds. In one embodiment, wafer 106 is spun slightly more than two full revolutions such as 2.1 revolutions or the like to provide a bit of overlap to assure that all data is collected.

As shown in FIG. 3, EBR distance 124 is the distance between wafer edge 101 and photoresist edge 111. Due to the extremely thin layers of photoresist and other materials utilized in semiconductor wafer technology, darkfield illumination is sometimes critical in identifying various stages and layers of wafer 100.

Each of the illustrations in FIGS. 1-3 can be pieced together through various digital images or frames secured by an edge top inspection camera. In one embodiment, for a 200 mm magnification configuration, 128 digital images are secured to ensure 360° of images. Greater magnification requires additional images, while less magnification requires fewer images. It is understood that other combinations of magnification and number of images may be utilized.

Figure 4:
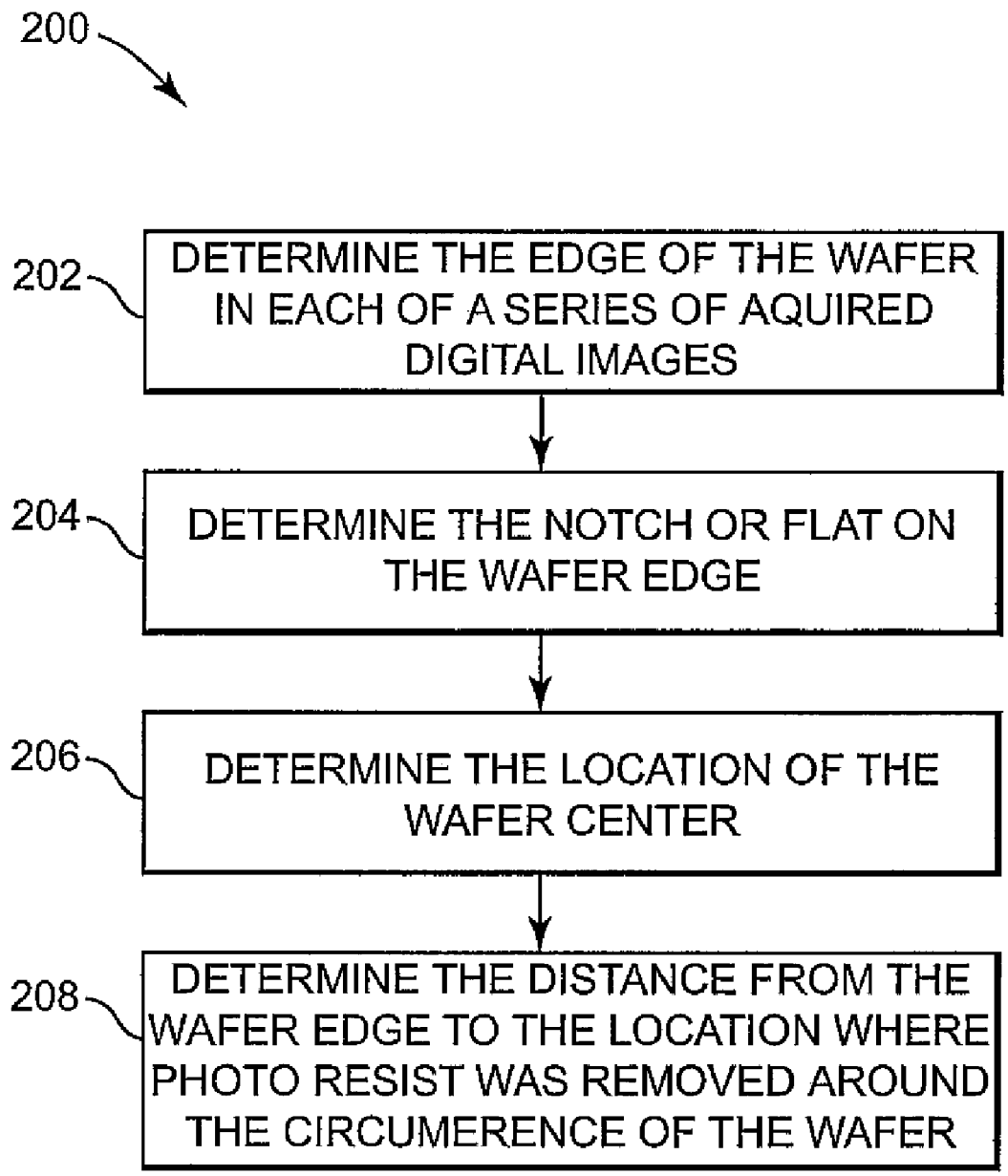
FIG. 4 is a flow diagram illustrating one embodiment of an edge bead removal measurement method.

FIG. 4 is a flow diagram illustrating edge bead removal measurement method 200. At 202, wafer edge 101 of wafer 100 is determined in each of a series of acquired digital images. At 204, notch 104 on wafer edge 101 is determined. At 206, the location of wafer center 102 is determined. At 208, EBR distance 112 from wafer edge 101 to photoresist edge 111 is determined around the circumference of wafer 100. Each of method steps 202-208 will be further described with reference to FIGS. 5-8.

Figure 5:
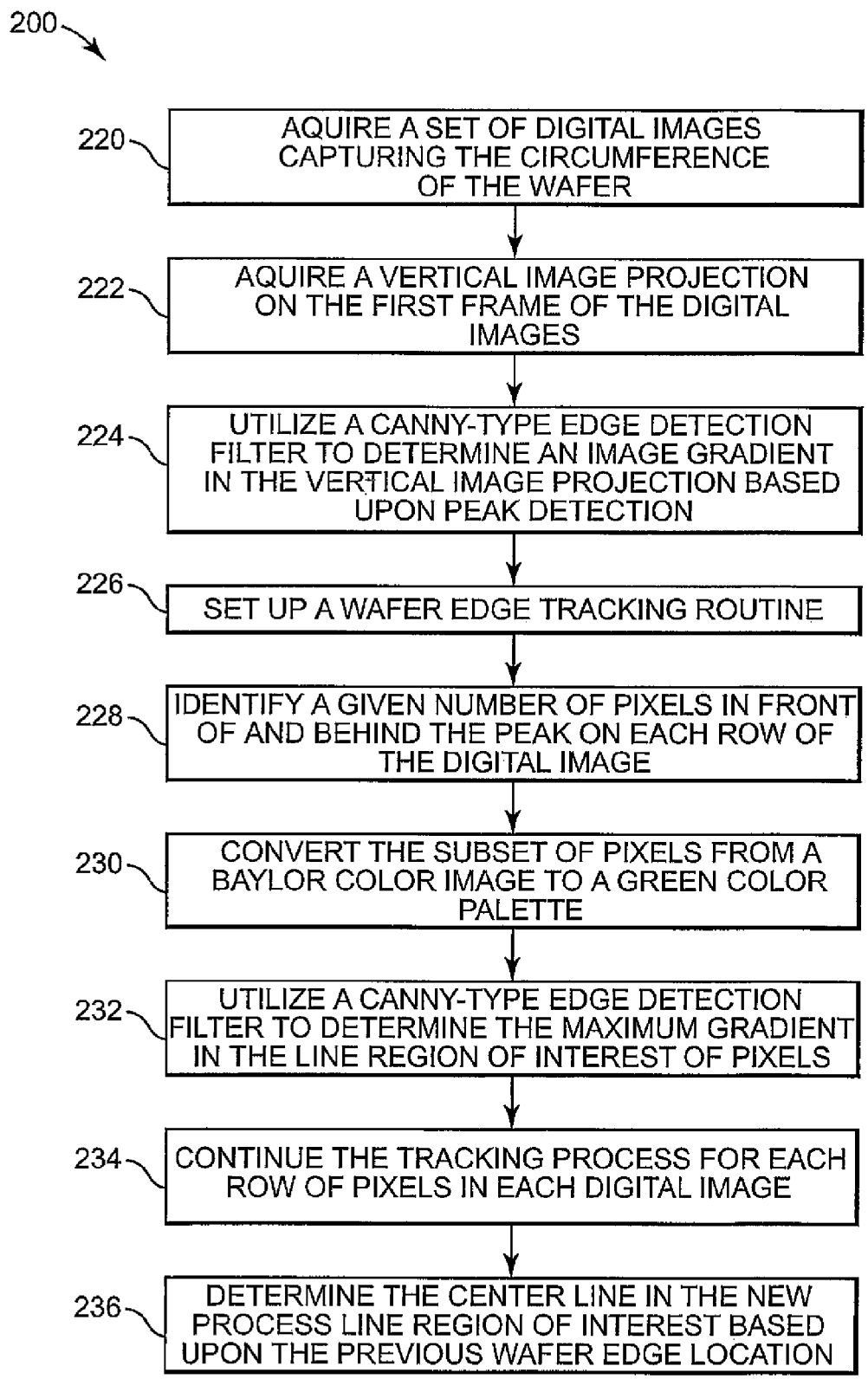
FIG. 5 is a flow diagram illustrating one embodiment of a method to determine the edge location of a wafer.

FIG. 5 is a flow diagram illustrating step 202 of FIG. 4 wherein wafer edge 101 of wafer 100 is determined in each of a series of acquired digital images as described with reference to FIGS. 1-3. In detail, at 220, a set of digital images is acquired of the wafer edge being inspected. An edge top inspection camera can be utilized to acquire image data around the entire circumference of the wafer being inspected. In one embodiment, an edge top inspection camera has a resolution up to 7 micrometers. The edge top inspection camera acquires numerous frames, such as up to 360 frames or more, in order to secure images about the entire circumference of the wafer being inspected.

In one embodiment, each digital image includes an image map having 1,600 horizontal pixels across the image and 1,200 vertical pixels from top to bottom of the image. In this example, an array having 1,600 elements is generated, which corresponds to a 200 mm image magnification configuration. However, it is understood that if a larger magnification is used, such as a 300 mm configuration, a larger number of digital images will be required. Similarly, if a smaller magnification is used, such as 100 mm, a smaller number of digital images will be required.

At 222, on the first digital image or frame, a vertical projection is taken. Utilizing an array of 1,600 horizontal pixels and 1,200 vertical pixels, an array having 1,600 elements is generated. Information from all of the 1,600 elements are added up and the average projection is determined, thereby generating the vertical projection. At 224, a Canny-type edge detection or other acceptable edge detection routine/filter, such as a LOG routine, is used to find the maximum image gradient in the vertical image projection. At 226, once the location of the maximum image gradient is found from the peak detection of the output of an edge detection filter, a wafer edge tracking routine is configured.

At 228, the wafer edge tracking routine identifies and clusters a given number of pixels behind or after the found peak and a given number of pixels in front or before the peak on each row of the image being processed into a subset. At 230, the subset of pixels is converted from a bayer color image to a green color palette for processing. At 232, a Canny-type edge detector or other acceptable edge detection routine/filter is used to find the maximum gradient in the line region of interest (ROI) of pixels. At 234, the tracking process continues for each row of pixels in each digital image or frame collected. At 236, the last wafer edge location found is used for the center position in the new process line ROI.

Figure 6:
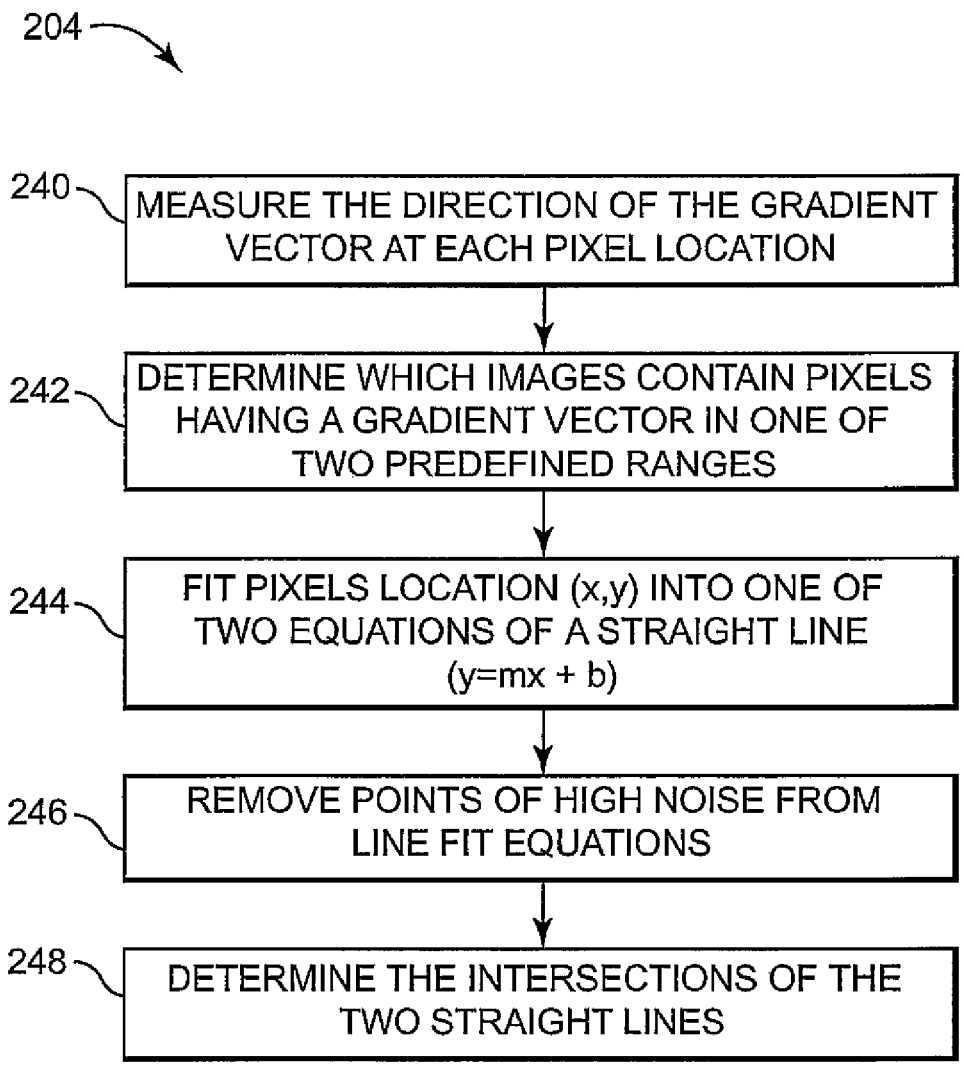
FIG. 6 is a flow diagram illustrating one embodiment of a method for determining a location of a notch on a wafer edge.

The process of finding the wafer notch (step 204 of FIG. 4) is illustrated in greater detail in FIG. 6. As shown in FIG. 6, at 240, the direction of the gradient vector is measured at each pixel location. At 242, digital images which contain pixels that have a gradient vector in one of two predefined ranges are identified. At 244, pixel locations (x, y) are fit to an equation a straight line y=mx+b for each of the two predefined regions. A recursive routine is utilized to eliminate or dropout noise or inconsistencies that are improperly biasing the straight line equations. At 246, points of high noise are dropped out from the line fit equations for each of the two defined regions. At 248, the intersections of the two lines are found which is the location of the wafer notch.

Figure 7:
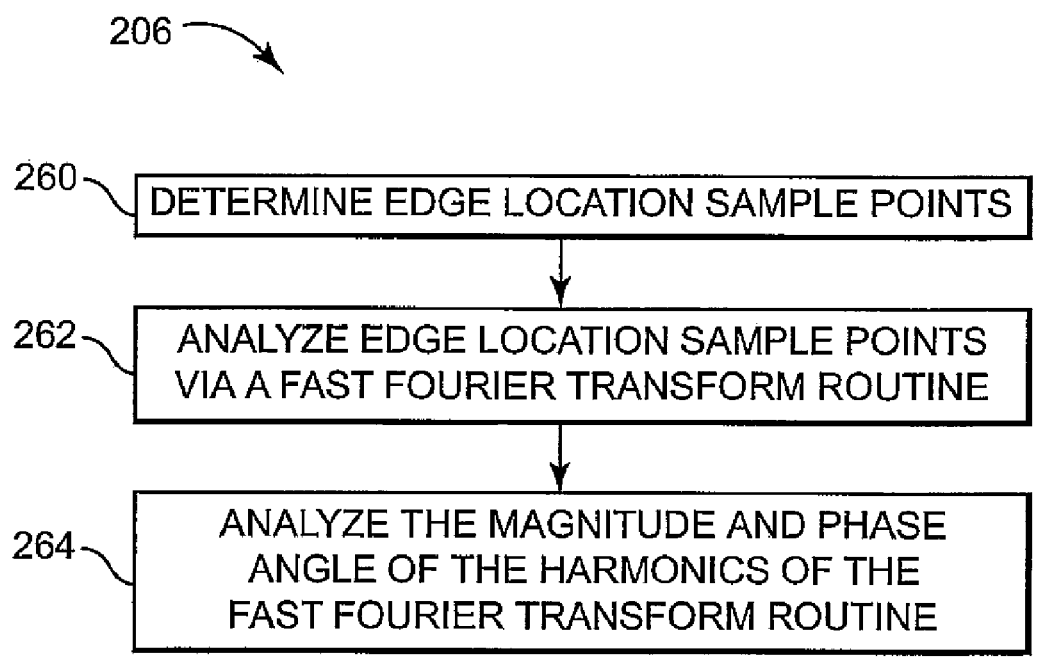
FIG. 7 is a flow diagram illustrating one embodiment of a method for determining the location of the center of the wafer.
Figure 8:
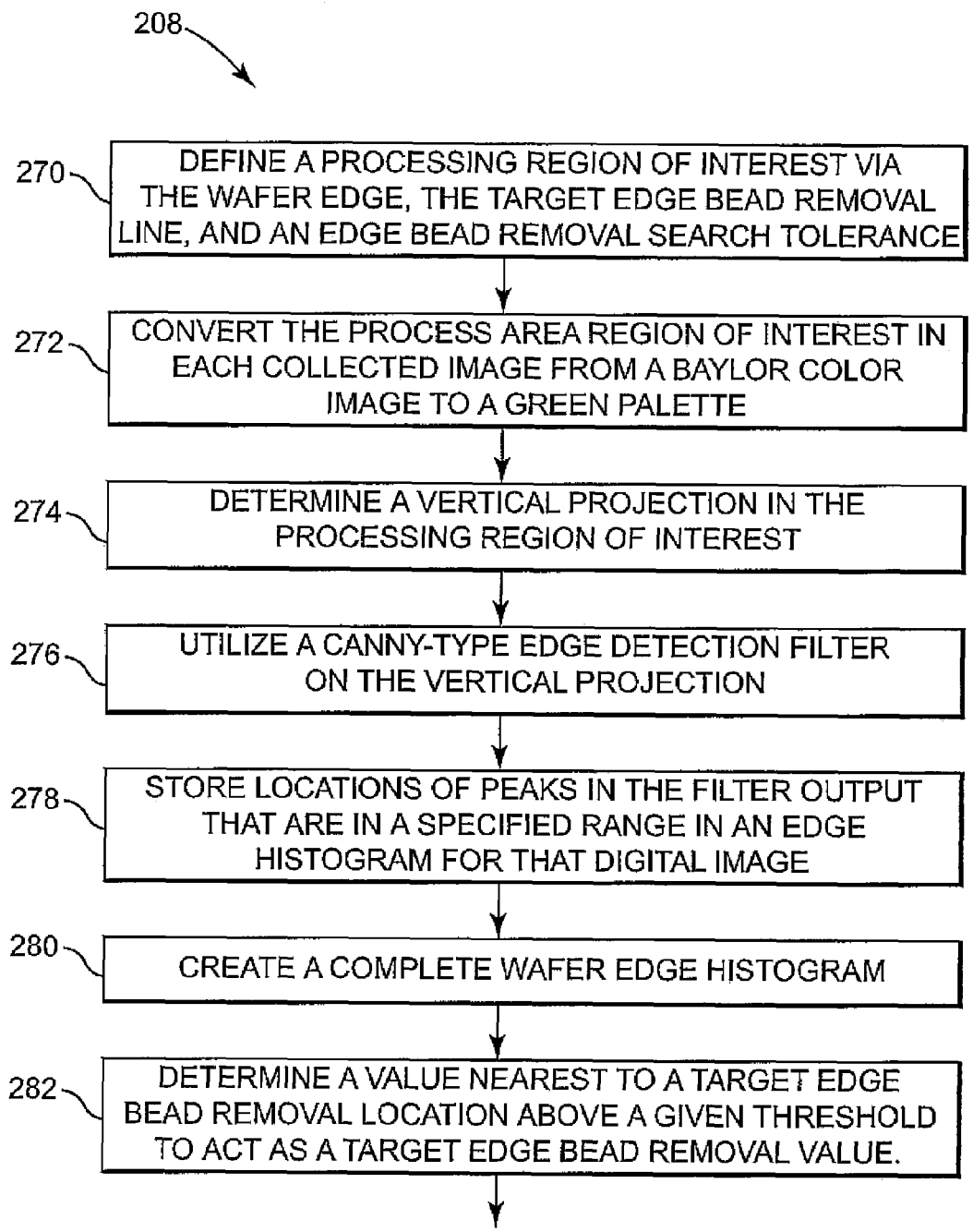
FIG. 8 is a flow diagram illustrating one embodiment of a method for determining the distance from a wafer edge to an edge bead removal location about the circumference of the wafer.
Figure 8:
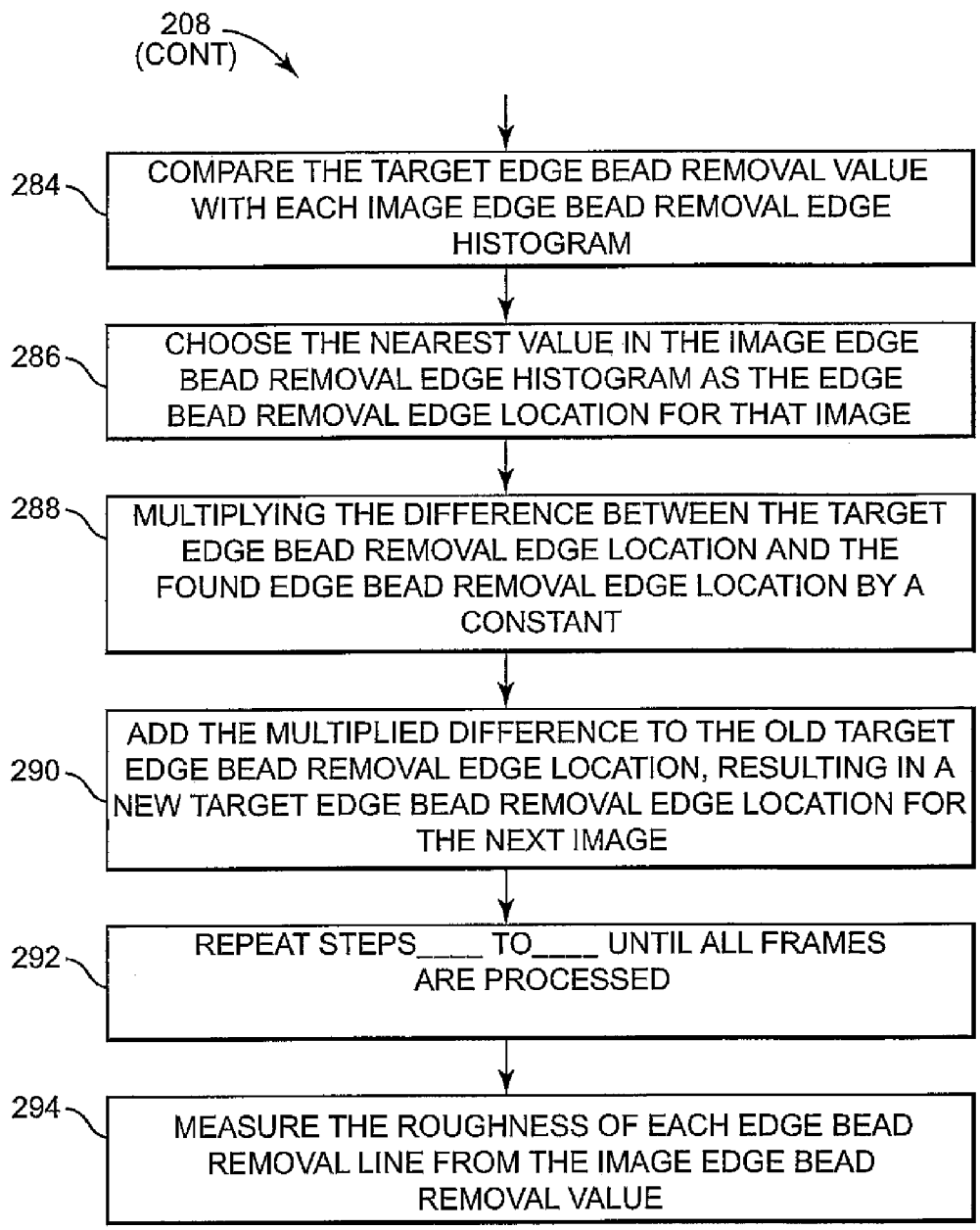

The process of determining the location of the wafer center (step 206 of FIG. 4) is illustrated in greater detail in FIG. 7. At 260, edge location sample points are determined. At 262, the edge location sample points are analyzed via a Fast Fourier Transform routine. At step 264, the magnitude and phase angle of the harmonics of the Fast Fourier Transform routine are analyzed, thereby determining the location of the wafer center.

Once the wafer edge, wafer notch, and wafer center are identified, the photoresist line EBR line or measurement is determined (step 208 of FIG. 4). This determination is illustrated in greater detail in FIG. 8. For an EBR location measurement, at 270, a processing ROI is defined by using the wafer edge and a target EBR line along with an EBR search tolerance. The method for finding the EBR line continues at 272 where the process area ROI in each collected digital image or frame is converted from a bayer color image to a green color palette for processing. At 274, a vertical image projection is taken in the processing ROI, similar to the vertical image discussed with reference to step 222. At 276, a Canny-type or other acceptable edge detection routine/filter is run on the vertical projection. At 278, locations of peaks in the filter output that are in a specified range are stored in an edge histogram for that digital image or frame. Generally, the edge histogram is a counter which identifies edge locations with respect to a predetermined threshold. The true edge of the histogram is the location having the largest number of counts. At 280, after all images or frames are processed, the edge histogram of each frame is used to create a complete wafer edge histogram by adding up each image or frame edge histogram. At 282, where the wafer edge histogram is filtered and a control loop determines a value nearest to the target EBR location above a given threshold is chosen to start as the target location for the first EBR edge on the next digital image or frame. In other words, the difference between the last identified edge location on a digital image and the first edge on the next digital image is split or halved, thereby narrowing in on the true edge location. At 284, the target EBR value is compared with each image or frame EBR edge histogram. At 286, the nearest value in the image or frame EBR edge histogram is chosen as the EBR edge location for that frame. At 288, the difference between the target EBR edge location and the found EBR edge location is multiplied by a constant. At 290, the multiplied difference value is added to the old target EBR edge location, which results in the new target EBR edge location for the next image or frame where this is done via a simple servo control loop with gain only. At 292, the above process is repeated until all digital images or frames are processed.

At 294, after the digital image or frame EBR edge locations are found, a refinement step can take place were the roughness of each EBR line can be measured from the image or frame EBR value.

A variation in the above procedure is to filter the green buffer data with the Canny-type edge detector or other acceptable edge detection routine/filter. The output of detector/filter is threasholded. The projection of the treasholded data can then be utilized. This allows counting the number of edge pixels in the EBR line to observe if the EBR line is valid.

Once the above process is complete, the EBR location data is then compared against known process tolerances to make a wafer pass/fail decision. A failed wafer can be stripped and re-worked saving fab manufacturing costs.

Figure 9:
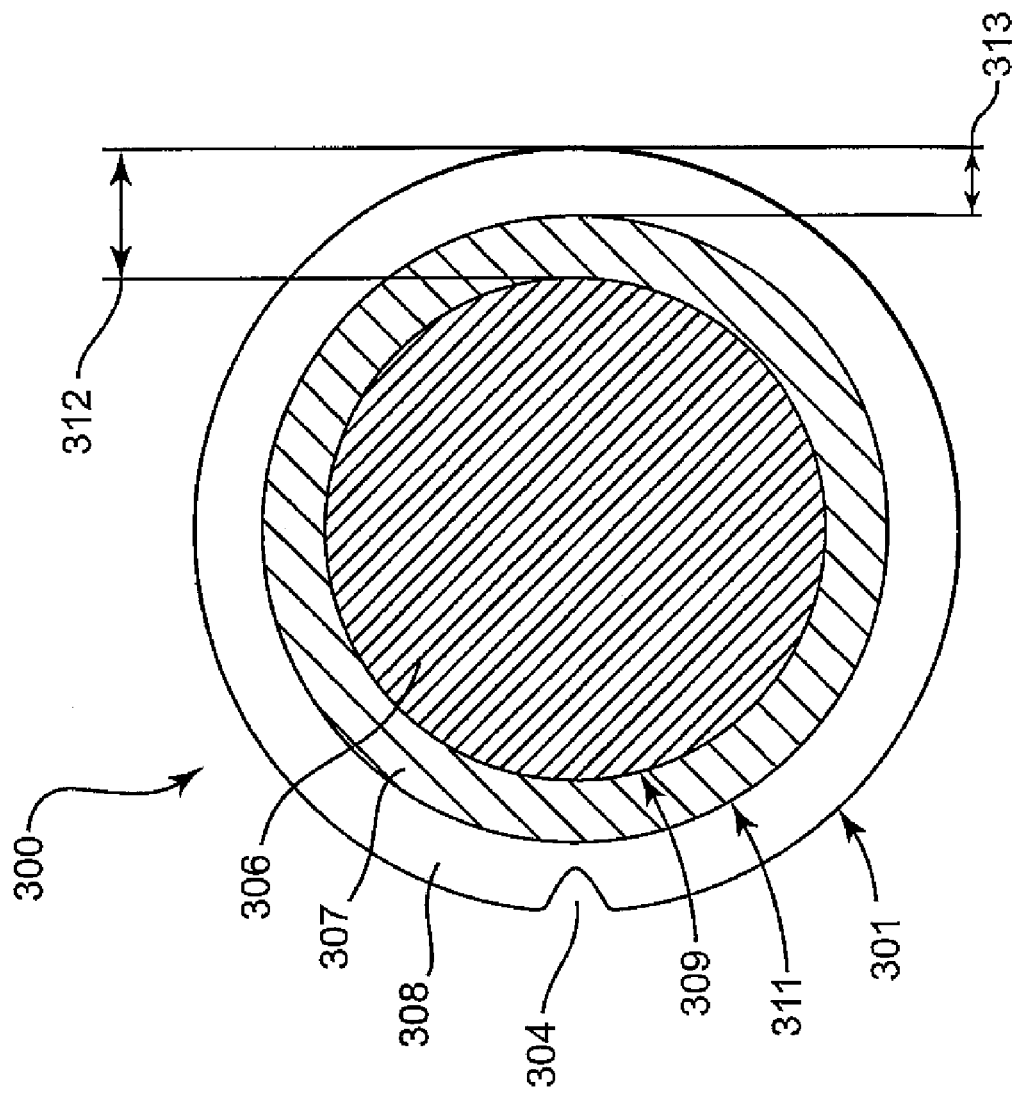
FIG. 9 is a top view of a wafer having multiple layers of photoresist.
Figure 4:
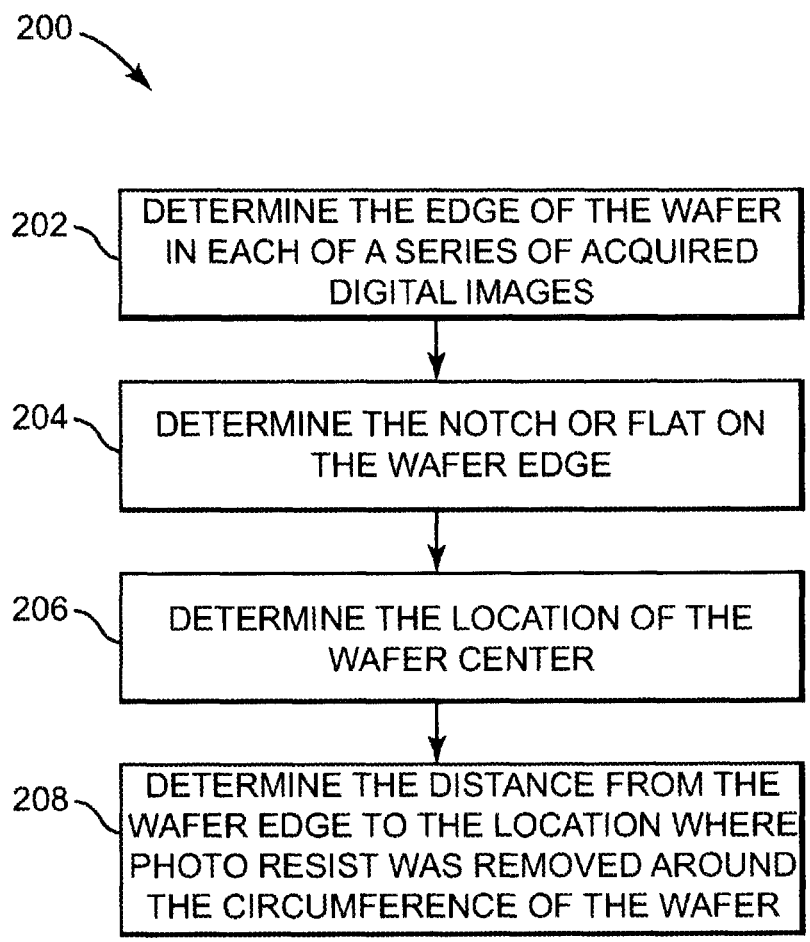
Figure 5:
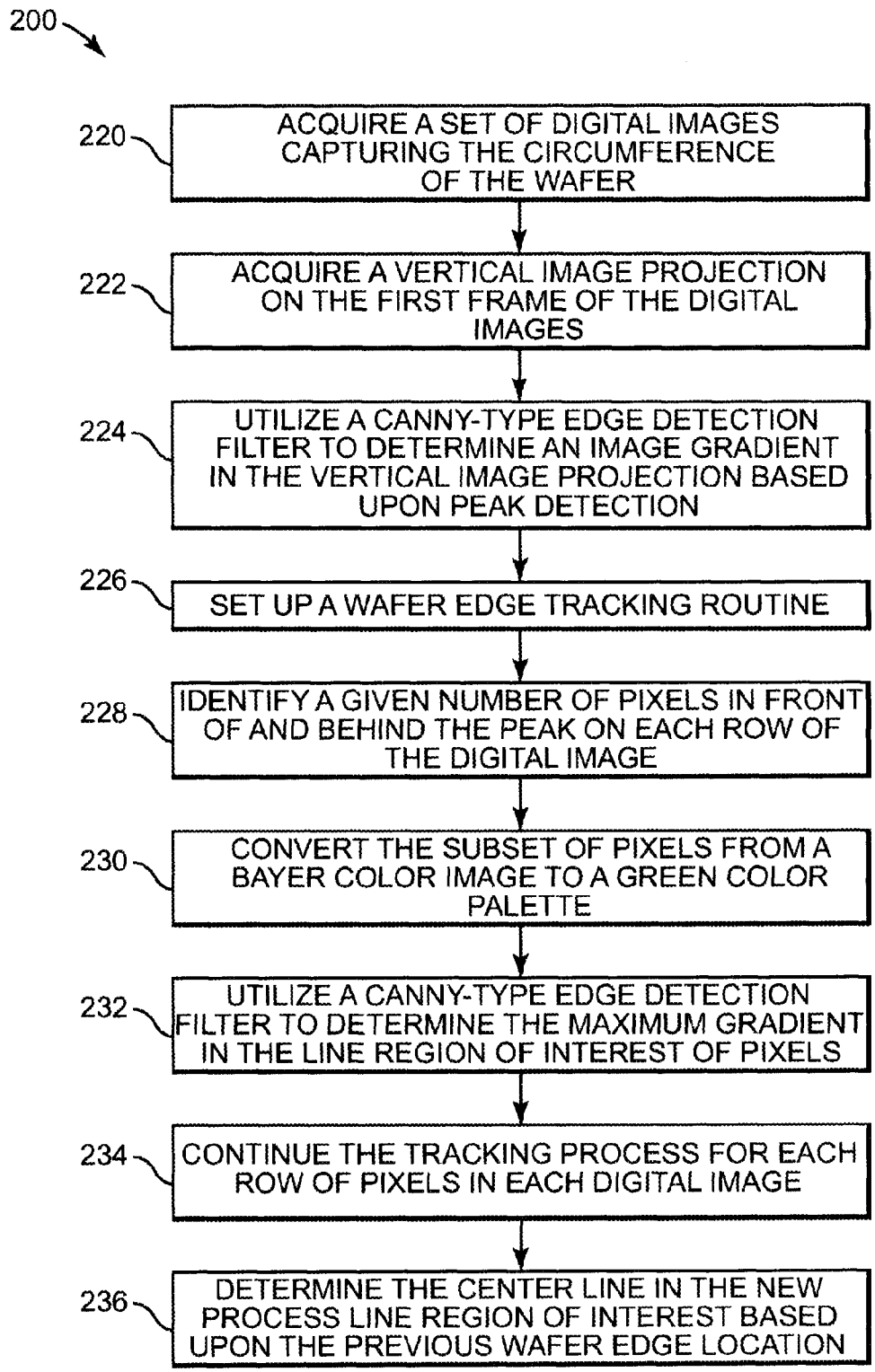
Figure 8:
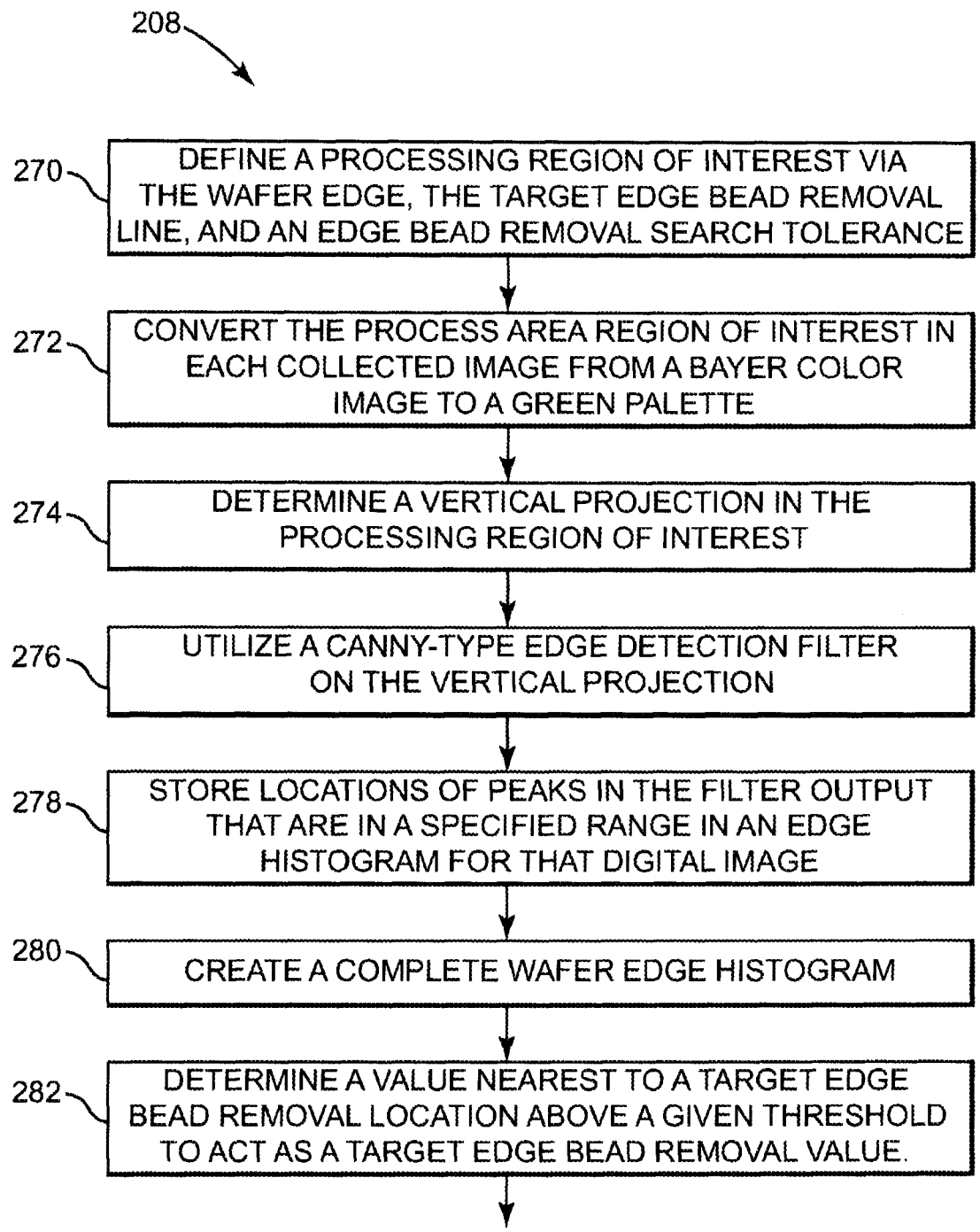

FIG. 9 is a top view of wafer 300 having multiple layers of photoresist. Wafer 300 includes wafer edge 301, wafer notch 304, photoresist layers 306 and 307, wafer area 308 having photoresist removed, photoresist edge 309 of layer 306, photoresist edge 311 of photoresist layer 307, edge bead removal distance 312 of photoresist layer 306 and edge bead removal distance 313 of photoresist layer 307. During fabrication of wafer 300, multiple layers of photoresist can be developed upon wafer 300. In such cases, it is sometimes important to determine many EBR lines about the circumference of wafer 300, each EBR line associated with a particular photoresist layer. The method of process steps shown and described with reference to FIGS. 4-8 can be utilized to gather separate information on each EBR line of interest. Therefore, all defects or unwanted specification deviations, such as wafer area 114 where photoresist should be present, but has been removed, or wafer area 116 with photoresist present which should have been removed, can be identified, regardless of the photoresist layer from which the defect is attributed. By repeating the process or method steps shown and described with reference to FIGS. 4-8, separate and distinct EBR line files can be accumulated for a single wafer.

Accordingly, the invention as described above and understood by one of skill in the art is simplified, provides an effective, safe, inexpensive, and efficient device, system and process which achieves all the enumerated objectives, provides for eliminating difficulties encountered with prior devices, systems and processes, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the invention's description and illustration is by way of example, and the invention's scope is not limited to the exact details shown or described.

Having now described the features, discoveries and principles of the invention, the manner in which it is constructed and used, the characteristics of the construction, and the advantageous, new and useful results obtained; the new and useful structures, devices, elements, arrangements, parts and combinations, are set forth in the appended claims.

What is claimed is:

1. A method for edge bead removal measurement comprising:
    obtaining a plurality of images of an edge bead removal area around substantially an entire periphery of a wafer, each image comprising an array of pixels;
    using at least one computation device to combine pixel values across each of a plurality of horizontal rows of pixels to form a single column of pixels, such combination being carried out for each of the plurality of images to form a plurality of single, vertical columns of pixels;
    based on the columns of pixels, using the at least one computation device to perform steps comprising:
        locating an edge of the wafer;
        locating a center of the wafer;
        locating a wafer orientation feature; and
        locating at least one edge bead removal boundary.

2. The method for edge bead removal measurement of claim 1, wherein the pixel values across each of a plurality of horizontal rows of pixels in each of the plurality of images includes averaging the pixel values across each of the plurality of horizontal rows.

3. The method for edge bead removal measurement of claim 1, wherein the pixel values of each pixel in each of the plurality of images are of a type selected from the group consisting of grey scale pixel values and Bayer color scale pixel values.

4. The method for edge bead removal measurement of claim 1, wherein the edge of the wafer is located in each of the plurality of single columns of pixels by identifying therein a location of maximum image gradient.

5. The method for edge bead removal measurement of claim 4, wherein locating an edge of the wafer further comprises:
    concatenating the plurality of images of an edge bead removal area in the order in which the plurality of images were captured to form a composite image of the edge bead removal area;
    establishing within each of the plurality of the images of the edge bead removal area a location of the edge of the wafer identified from each of the corresponding single column of pixels; and
    clustering pixels horizontally from the location established within each of the plurality of images to establish a subset of pixels of each of the plurality of images that contains the edge of the wafer within the given image.

6. The method for edge bead removal measurement of claim 5, wherein locating an edge of the wafer further comprises:
    analyzing the subsets of pixels using an edge detection filter to identify a location of maximum intensity gradient for each column of an image of the edge bead removal area; and
    repeating the edge detection filter identification for each column in each of the plurality of images of the edge bead removal area to identify substantially the entire wafer edge.

7. The method for edge bead removal measurement of claim 6, wherein locating a wafer orientation feature comprises:
    identifying pixels on the wafer edge in each of the plurality of images of the edge bead removal area that fall outside a predetermined range; and
    fitting at least one straight line to the pixels that fall outside the predetermined range to at least partially define the wafer orientation feature.

8. The method for edge bead removal measurement of claim 7, wherein the wafer orientation feature is a notch, and further wherein locating a wafer orientation feature comprises fitting a second line to the pixels that fall outside the predetermined range to fully define the wafer orientation feature.

9. The method for edge bead removal measurement of claim 6, wherein locating a center of the wafer comprises applying a fast fourier transform to the identified edge of the wafer to identify the center thereof.

10. The method for edge bead removal measurement of claim 6, wherein locating an edge bead removal boundary comprises:
    defining a nominal location for an edge bead removal boundary relative to the wafer edge;
    defining a region of interest around the nominal location for an edge bead removal boundary;
    locating in a region of interest in each of the plurality of single columns of pixels of a maximum image intensity is obtained and a location with each corresponding image of the plurality of images of the edge bead removal area is established; and
    clustering pixels horizontally from the location established within each of the plurality of images to establish a subset of pixels of each of the plurality of images that contains the edge bead removal boundary within a given image.

11. A method of controlling an edge bead removal unit comprising:
    capturing at least one image of a wafer edge region;
    forming a one dimensional projection of the at least one image;
    identifying a location of maximum pixel intensity gradient in the one dimensional projection;
    mapping the location of the maximum pixel intensity gradient in the one dimensional projection to the at least one image from which the projection was derived;
    clustering a series of pixels of the at least one image across the at least one image based at least in part on a similarity in pixel intensity gradient values;
    modifying a wafer processing step in the edge bead removal unit based on the location of the clustered series of pixels on the semiconductor wafer edge region; and
    applying the modified wafer processing step using the edge bead removal unit to modify at least one of the wafer and a subsequent wafer.

12. The method of controlling an edge bead removal unit of claim 11, wherein the boundary is selected from a group consisting of a wafer edge and an edge bead removal boundary.

13. The method of controlling an edge bead removal unit of claim 11, further comprising illuminating the semiconductor wafer edge region with an illuminator selected from a group consisting of a bright field illuminator, a darkfield illuminator, and a combined bright- and darkfield illuminator.

14. The method of controlling an edge bead removal unit of claim 11, further comprising repeating the finding process at least once to identify at least one additional boundary in the semiconductor wafer edge region.

15. The method of controlling an edge bead removal unit of claim 14, wherein at least one of the boundary and the at least one additional boundary is a wafer edge and the other is an edge bead removal boundary.

16. The method of controlling an edge bead removal unit of claim 11, wherein the one dimensional projection is formed from a subset of all pixels of the at least one image.

17. The method of controlling an edge bead removal unit of claim 16, wherein the subset of all pixels of the at least one image is selected from a group consisting of a plurality of columns of pixels of the at least one image and a plurality of rows of pixels of the at least one image.

18. The method of controlling an edge bead removal unit of claim 11, further comprising capturing images of substantially the entire semiconductor wafer edge region around a periphery of the semiconductor wafer.

19. The method of controlling an edge bead removal unit of claim 18, further comprising identifying the boundary around substantially an entirety of the periphery of the semiconductor wafer edge region by extending the clustering step around substantially the entire periphery of the semiconductor wafer.

20. The method of controlling an edge bead removal unit of claim 18, further comprising stitching together adjacent ones of the at least one image by aligning the adjacent ones of the at least one image based at least in part on the location of the maximum pixel intensity gradient in the adjacent edges of the adjacent ones of the at least one image.

21. The method of controlling an edge bead removal unit of claim 11 wherein the at least one image is captured within the edge bead removal unit.

22. The method of controlling an edge bead removal unit of claim 11 wherein the at least one image is captured outside the edge bead removal unit.

\* \* \* \* \*

UNITED STATES PATENT AND TRADEMARK OFFICE
CERTIFICATE OF CORRECTION

| | | |
|---|---|---|
| PATENT NO. | : 7,684,611 B2 | Page 1 of 1 |
| APPLICATION NO. | : 11/676140 | |
| DATED | : March 23, 2010 | |
| INVENTOR(S) | : Simpkins | |

It is certified that error appears in the above-identified patent and that said Letters Patent is hereby corrected as shown below:

Column 6, line 30, delete "threasholded." and insert in place thereof --thresholded.--.

Column 6, line 30, delete "threasholded" and insert in place thereof --thresholded--.

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,684,611 B2  Page 1 of 4
APPLICATION NO. : 11/676140
DATED : March 23, 2010
INVENTOR(S) : Simpkins It is certified that error appears in the above-identified patent and that said Letters Patent is hereby corrected as shown below:

Delete Drawing Sheets 4, 5, and 8 and substitute therefore the attached Drawing Sheets 4, 5, and 8.

Column 6, line 30, delete "threasholded." and insert in place thereof --thresholded.--.

Column 6, line 30, delete "threasholded" and insert in place thereof --thresholded--.

This certificate supersedes the Certificate of Correction issued May 25, 2010.

Signed and Sealed this

Twenty-ninth Day of June, 2010

David J. Kappos
*Director of the United States Patent and Trademark Office*